United States Patent [19]

Watanuki et al.

[11] Patent Number: 5,089,450
[45] Date of Patent: Feb. 18, 1992

[54] CATALYST FOR POLYMERIZATION OF ORGANOSILOXANES

[75] Inventors: Isao Watanuki; Nobuhiko Kodana; Makoto Sato, all of Annaka, Japan

[73] Assignee: Shin-Etsu Chemical Co., Ltd., Tokyo, Japan

[21] Appl. No.: 647,354

[22] Filed: Jan. 29, 1991

[30] Foreign Application Priority Data

Jan. 30, 1990 [JP] Japan .................. 2-20296

[51] Int. Cl.⁵ .............................. C08F 4/00
[52] U.S. Cl. ...................... 502/158; 502/164
[58] Field of Search .................. 502/158, 164

[56] References Cited

U.S. PATENT DOCUMENTS 4,888,405 12/1989 Gamon et al. .................. 556/462

Primary Examiner—Patrick P. Garvin
Assistant Examiner—Brent M. Peebles
Attorney, Agent, or Firm—Oblon, Spivak, McClelland, Maier & Neustadt

[57] ABSTRACT

The process of producing a catalyst for polymerization of organosiloxanes comprises heat-treating a mixture of an aqueous solution of a tetraalkylphosphonium hydroxide, such as tetramethylphosphonium hydroxide, and a cyclic or noncyclic siloxane component, thereby controlling the water content of the system so that the molar ratio of the amount of water in the system to the amount of the quaternary phosphonium hydroxide component in the system will be from 3.0 to 4.0. The process ensures that the crystallization of the tetraalkylphosphonium hydroxide component in the catalyst is obviated effectively.

10 Claims, No Drawings

CATALYST FOR POLYMERIZATION OF ORGANOSILOXANES

BACKGROUND OF THE INVENTION

1. Field of the Invention

The present invention relates to a polymerization catalyst for use in producing a high molecular weight polyorganosiloxanes by polymerization of a low molecular weight organosiloxane.

2. Description of the Prior Art

Siliconates of quaternary phosphonium hydroxides are known as catalysts for polymerization of organosiloxanes, and have such properties that they exhibit catalytic activity at low temperatures and, when heated, readily decompose to loose the activity.

As contrasted to those catalysts which cannot be deactivated without neutralization, the above-mentioned siliconate catalysts can be used without need for removal of salts arising from neutralization and are known to be particularly useful for polymerization of crude rubbers or high-viscosity oils (See, for instance, J. Polymer Sci. 40. 35 (1959)).

Methods for producing siliconates of quaternary phosphonium hydroxides are disclosed, for instance, in U.S. Pat. No. 2,883,366, J. Polymer Sci. 40, 35 (1959), and so on. For example, a siliconate of a quaternary phosphonium hydroxide is known to be synthesized by dehydration condensation of an aqueous quaternary phosphonium hydroxide solution and a siloxane.

However, the quaternary phosphonium hydroxide siliconate catalysts produced by the conventional methods as mentioned above may show, during storage thereof, precipitation of crystals which are rich in the quaternary phosphonium hydroxide (the concentration of the quaternary phosphonium hydroxide in the crystals is from 45 to 55% by weight). Especially as the atmospheric temperature is lowered, the precipitation of the crystals takes place more heavily. The precipitated crystals collect, for example, in the bottom of a storage vessel, resulting in a variation of the concentration of the quaternary phosphonium hydroxide with the vertical position in the container.

Such a variation in the concentration of the quaternary phosphonium hydroxide is extremely undesirable because when the quaternary phosphonium hydroxide siliconate catalyst is used as a polymerization catalyst, the amount of the catalyst is reduced, in effect, and unsatisfactory polymerization would be caused thereby.

Once the aforementioned crystal precipitation has occurred, it is difficult to render the concentration of the quaternary phosphonium hydroxide uniform. For instance, a method of stirring the crystals and the liquid to obtain a uniform system, a method of heating the crystal-containing mixture to dissolve the crystals, and the like methods can produce a uniform quaternary phosphonium hydroxide concentration only momentarily, and the uneven concentration will soon appear again.

SUMMARY OF THE INVENTION

Accordingly, it is an object of the present invention to obviate effectively the crystallization of a quaternary phosphonium hydroxide component in a quaternary phosphonium hydroxide-containing catalyst for polymerization of organosiloxanes.

According to the present invention, there is provided a process of producing a catalyst for polymerization of an organosiloxane, which comprises the step of heat-treating mixture comprising:

(A) an aqueous solution of a quaternary phosphonium hydroxide having the following general formula [I]:

$$(R^1)_4POH \qquad [I]$$

wherein $R^1$ is an alkyl, cycloalkyl, aryl, alkaryl or aralkyl group, and the four $R^1$ groups may be the same or different, and (B) at least one member selected from the group consisting of a cyclosiloxane having the following general formula [II]:

$$[(R^2)_2SiO]_n \qquad [II]$$

wherein $R^2$ may be the same or different and are each an alkyl, cycloalkyl, vinyl, aryl, alkaryl, haloalkyl or haloaryl group, and n is an integer of 3 or above, and a siloxane having the following general formula [III]:

$$R^3(R^2)_2SiO[(R^2)_2SiO]_mSi(R^2)_2R^3 \qquad [III]$$

wherein $R^2$ is as defined above, $R^3$ may be the same or different and are each an alkyl, cycloalkyl, vinyl, aryl, alkaryl, haloalkyl, haloaryl or hydroxyl group, and m is 0 or a positive integer, thereby controlling the water content of the system so that the molar ratio of the amount of water in the system to the amount of the quaternary phosphonium hydroxide component in the system will be from 3.0 to 4.0.

In the present invention, it is a distinguishing feature to control the water content of the catalyst to within a predetermined range based on the amount of the quaternary phosphonium hydroxide component in the catalyst. By this control, it is ensured that the precipitation of crystals of the quaternary phosphonium hydroxide component in the catalyst is inhibited effectively and, when the catalyst is preserved for a long time, the development of a nonuniformity in the concentration of the quaternary phosphonium hydroxide component due to crystallization is obviated effectively.

Thus, according to the present invention the catalyst for polymerization of organosiloxanes can be used with no need for a step of uniforming the catalyst, and it is possible to prevent effectively the unsatisfactory polymerization which would otherwise arise from a nonuniform concentration of the catalyst component.

DETAILED DESCRIPTION OF THE INVENTION

(A) Quaternary phosphonium hydroxide

In the present invention, the quaternary phosphonium hydroxide is one which has the aforementioned general formula [I], namely:

$$(R^1)_4POH \qquad [I]$$

wherein $R^1$ is as defined above.

In the formula, the group $R^1$ is an alkyl group such as methyl, ethyl, propyl, n-butyl, iso-butyl, hexyl, octyl, etc.; a cycloalkyl group such as cyclohexyl, cycloheptyl, etc.; an aryl group such as phenyl, diphenyl, etc.; an alkaryl group such as tolyl, xylyl, etc.; or an aralkyl group such as benzyl, phenylethyl, etc., and the four $R^1$ groups are independent, and may be different, from each other.

In the present invention, the quaternary phosphonium hydroxide can be used either singly or in combination of two or more. Especially preferred quaternary phosphonium hydroxides include tetramethylphosphonium hydroxide, tetraethylphosphonium hydroxide and tetra-n-butylphosphonium hydroxide.

(B) Siloxane component

In the present invention, the siloxane used in combination with the above quaternary phosphonium hydroxide is a cyclic siloxane having the aforementioned general formula [II], namely:

$$[(R^2)_2SiO]_n \qquad [II]$$

wherein $R^2$ and n are as defined above, or a noncyclic siloxane having the aforementioned general formula [III], namely:

$$R^3(R^2)_2SiO[(R^2)_2SiO]_mSi(R^2)_2R^3 \qquad [III]$$

wherein $R^2$, $R^3$ and m are as defined above.

In the above general formulas, the group $R^2$ is an alkyl group such as methyl, ethyl, propyl, butyl, octyl, etc.; a cycloalkyl group such as cyclopentyl, cyclohexyl, etc.; a vinyl group; an aryl group such as phenyl, diphenyl, etc.; an alkaryl group such as tolyl, xylyl, etc.; an aralkyl group such as benzyl, phenylethyl, etc.; a haloalkyl group such as 3-chloropropyl, 4-chlorobutyl, 3-fluoropropyl, etc.; or an haloaryl group such as chlorophenyl, dibromophenyl, etc., and the $R^2$ groups may be the same or different from each other. In the formulas, n is an integer of 3 or above.

Furthermore, the group $R^3$ is an alkyl group such as methyl, ethyl, propyl, butyl, octyl, etc.; a cycloalkyl group such as cyclopentyl, cyclohexyl, etc.; a vinyl group; an aryl group such as phenyl, diphenyl, etc.; an alkaryl group such as tolyl, xylyl, etc.; an aralkyl group such as benzyl, phenylethyl, etc.; a haloalkyl group such as 3-chloropropyl, 4-chlorobutyl, 3-fluoropropyl, etc.; a haloaryl group such as chlorophenyl, dibromophenyl, etc.; or a hydroxyl group, and the $R^3$ groups may be the same or different from each other.

In the formulas, m is 0 or a positive integer.

The siloxane as above may be used either singly or in combination of two or more. In the present invention, especially preferred examples of the cyclic siloxane having the general formula [I] are those in which the group $R^2$ is a methyl, phenyl or vinyl group and n is from 3 to 6, whereas particularly preferred examples of the siloxane having the general formula [III] are those in which the group $R^2$ is a methyl, phenyl or vinyl group, the group $R^3$ is a methyl, phenyl, vinyl or hydroxyl group and m is from 2 to 50.

Production of the catalyst

The catalyst for polymerization of siloxanes according to the present invention is produced by heat-treating a mixture of an aqueous solution of the aforementioned quaternary phosphonium hydroxide with the aforementioned siloxane having the general formula [II] and/or the aforementioned siloxane having the general formula [III].

The amount of the quaternary phosphonium hydroxide used here is preferably from 5 to 30% by weight, more preferably from 8 to 25% by weight, based on the siloxane used together therewith. When this amount is less than 5% by weight, the catalyst used for polymerization of polyorganosiloxanes can exhibit the effective catalytic action only if used in a large amount, which is disadvantageous from a productivity viewpoint. When the amount of the quaternary phosphonium hydroxide used is more than 30% by weight, on the other hand, the concentration of the quaternary phosphonium hydroxide in the resulting catalyst is close to the concentration of the quaternary phosphonium hydroxide in the crystals which precipitate (namely, about 45% by weight), so that it is difficult to achieve the object of the present invention, i.e., prevention of the precipitation of the crystals.

The concentration of the aqueous solution of the quaternary phosphonium hydroxide used in the present invention is not particularly limited, insofar as the water content in the system under consideration can be controlled effectively by the heat treatment, which will be described below. It is generally preferable, however, that the concentration of the solution is from 10 to 50% by weight.

In the present invention, the heat treatment of the mixture of the aqueous solution of the quaternary phosphonium hydroxide with the siloxane as mentioned above is carried out preferably in the temperature range from 35 to 80° C., more preferably from 40 to 50° C. Generally, the heat treatment is carried out under a reduced pressure of 100 mmHg or below, or with supplying an inert gas such as nitrogen, helium, argon, etc. When the heat treatment temperature is lower than 35° C., the control of the water content requires a long period of time, which is disadvantageous on an economical basis, and the resulting catalyst may be unsatisfactory in activity. A heat treatment temperature of above 80° C. may also result in an insufficient activity of the catalyst obtained.

It is important, in the present invention, to control the water content of the system by the aforementioned heat treatment so that the molar ratio of the amount of water in the system to the amount of the quaternary phosphonium hydroxide component in the system will be from 3.0 to 4.0. The control of water content can be easily achieved by continuing the heat treatment for a suitable period further from the time when the system being treated becomes transparent. In this case, the control of water content can be performed speedily, under the aforementioned controlled system temperature (35-80° C.) or reduced pressure (100 mmHg or below) or by regulating the rate of supply of the inert gas. In the present invention, if the water content of the system is below the aforementioned range, the resulting catalyst is susceptible to precipitation of crystals, as will be evident from the results of examples below. When the water content is above the aforementioned range, on the other hand, the resulting catalyst system is opaque (milky white) and has separate aqueous and oily phases, and the catalyst itself is present in a nonuniform state.

Catalyst

In the catalyst for polymerization of organosiloxanes according to the present invention, obtained as above, the amount of water has been controlled by the above heat treatment to within the aforementioned range. Furthermore, it is considered, though not clear, that part of each component of the system has undergone dehydration condensation to form the following condensates (Refer to J. Polymer Sci. 40, 41 (1959)):

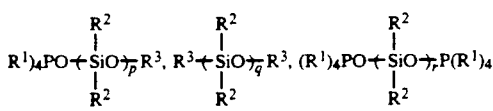

wherein $R^1$ to $R^3$ are as defined above, and p, q and r are each a positive integer.

That is to say, the catalyst for polymerization of organosiloxanes according to the present invention seems to contain the dehydration condensates as above, in addition to the aforementioned quaternary phosphonium hydroxide component of the general formula [I] and siloxane component(s) of the general formula [II] and/or the general formula [III]. The formation of such dehydration condensates is considered to contribute to the effective catalytic activity exhibited by the catalyst.

The concentration of the quaternary phosphonium hydroxide component, inclusive of the above dehydration condensation products, in the catalyst is preferably from 5 to 30% by weight, more preferably from 8 to 25% by weight, based on the siloxane component.

EXAMPLES

In the following Examples and Comparative Examples, the concentration of the quaternary phosphonium hydroxide (hereinafter referred to simply as hydroxide concentration) was determined by titration with 0.1 N aqueous hydrochloric acid solution. The water content was measured by Karl Fischer's method.

Example 1

A reaction vessel equipped with a stirrer and a vacuum apparatus was charged with 551.8 g of a cyclic dimethylsiloxane and 139.2 g of an aqueous 41.1 wt. % solution of tetra-n-butylphosphonium hydroxide, and the resulting mixture was heat-treated with stirring at a temperature of from 35 to 45° C. and under a reduced pressure of from 25 to 10 mmHg.

Upon the change of the reaction mixture from a milky white to a transparent state, the temperature was changed to 43° C. and the reduced pressure to about 82 mmHg, and the heat treatment was further continued then on, under the thus changed conditions, to be finished after 3 hours.

The catalyst thus formed had a hydroxide concentration of 10.3% by weight and a water content to hydroxide concentration ratio (molar ratio) of 3.63.

When the catalyst was sealed in a sample bottle and preserved for 6 months at a temperature of −5° C., no crystallization was observed.

Example 2

A mixture of 468.1 g of a cyclic dimethylsiloxane, 82.5 g of a dimethylpolysiloxane having a viscosity of 20 cSt at 25° C. and 137.7 g of an aqueous 41.1 wt. % solution of tetra-n-butylphosphonium hydroxide was heat-treated in the same manner as in Example 1.

Upon the change of the reaction mixture from a milky white to a transparent state, the temperature was changed to 42° C. and the reduced pressure to about 19 mmHg, and the heat treatment was further continued then on, under the thus changed conditions, to be finished after 0.5 hour.

The catalyst thus formed had a hydroxide concentration of 10.3% by weight and a water content to hydroxide concentration ratio (molar ratio) of 3.22.

When the catalyst was sealed in a sample bottle and preserved for 4 months at a temperature of −5° C., no crystallization was observed.

Example 3

A mixture of 288.8 g of a cyclic dimethylsiloxane and 179.9 g of an aqueous 40.4 wt. % solution of tetra-n-butylphosphonium hydroxide was heat-treated in the same manner as in Example 1.

Upon the change of the reaction mixture from a milky white to a transparent state, the temperature was changed to 44° C. and the reduced pressure to about 15 mmHg, and the heat treatment was further continued then on, under the thus changed conditions, to be finished after 0.7 hour.

The catalyst thus formed had a hydroxide concentration of 23.5% by weight and a water content to hydroxide concentration ratio (molar ratio) of 3.83.

When the catalyst was sealed in a sample bottle and preserved for 6 months at room temperature, no crystallization was observed.

Comparative Example 1

The catalyst prepared in Example 1 was further heat-treated by maintaining under the conditions of 45° C. and a reduced pressure of about 20 mmHg for 2 hours.

The catalyst thus formed had a hydroxide concentration of 10.3% by weight and a water content to hydroxide concentration ratio (molar ratio) of 2.68.

When the catalyst was sealed in a sample bottle and preserved at room temperature, precipitation of crystals occurred on the second day.

Comparative Example 2

The catalyst prepared in Example 2 was further heat-treated by maintaining under the conditions of 45° C. and a reduced pressure of about 15 mmHg for 4 hours.

The catalyst thus formed had a hydroxide concentration of 9.9% by weight and a water content to hydroxide concentration ratio (molar ratio) of 2.42.

When the catalyst was sealed in a sample bottle and preserved at room temperature, precipitation of crystals occurred within 3 hours.

Comparative Example 3

The catalyst prepared in Example 3 was further heat-treated by maintaining under the conditions of 45° C. and a reduced pressure of about 16 mmHg for 6 hours.

The catalyst thus formed had a hydroxide concentration of 23.9% by weight and a water content to hydroxide concentration ratio (molar ratio) of 2.73.

When the catalyst was sealed in a sample bottle and preserved at room temperature, precipitation of crystals occurred within 10 minutes.

We claim:

1. A process of producing a catalyst for polymerization of an organosiloxane, which comprises the step of heat-treating at a temperature of from 35 to 80° C. a mixture comprising:

(A) an aqueous solution of a quaternary phosphonium hydroxide having the following general formula [I]:

$$(R^1)_4POH \qquad [I]$$

wherein $R^1$ is an alkyl, cycloalkyl, aryl, alkaryl, or aralkyl group, and the four $R^1$ groups are the same or different, and (B) at least one member selected from the group consisting of a cyclosiloxane having the following general formula [II]:

$$[(R^2)_2SiO]_n \quad \text{[II]}$$

wherein $R^2$ is the same or different and are each an alkyl, cycloalkyl, vinyl, aryl, alkaryl, haloalkyl or haloaryl group, and n is an integer of 3 or above, a siloxane having the following general formula [III]:

$$R^3(R^2)_2SiO[(R^2)_2SiO]_mSi(R^2)_2R^3 \quad \text{[III]}$$

wherein $R^2$ is as defined above, $R^3$ is the same or different and are each an alkyl, cycloalkyl, vinyl, aryl, alkaryl, haloalkyl, haloaryl or hydroxyl group, and m is 0 or a positive integer, and controlling the water content of the system so that the molar ratio of the amount of water in the system to the amount of the quaternary phosphonium hydroxide component in the system is from 3.0:1 to 4.0:1.

2. The process according to claim 1, wherein the heat treatment is carried out under a reduced pressure of 100 mmHg or below.

3. The process according to claim 1, wherein the heat treatment is carried out with an inert gas being supplied.

4. The process according to claim 1, wherein the quaternary phosphonium hydroxide component is present in an amount of from 5 to 30% by weight based on the siloxane of component (B).

5. The process according to claim 6, wherein the quaternary phosphonium hydroxide comprises at least one member selected from the group consisting of tetramethylphosphonium hydroxide, tetraethylphosphonium hydroxide and tetra-n-butylphosphonium hydroxide.

6. The process according to claim 1, wherein a dehydration condensation product is formed from the quaternary phosphonium hydroxide and the siloxane of component (B) by the heat treatment.

7. A catalyst for polymerization of an organosiloxane obtained by the process according to claim 1.

8. The process according to claim 1, wherein said temperature is from 40° to 50° C.

9. The process according to claim 1, wherein (B) consists essentially of said cyclosiloxane (II).

10. The process according to claim 1, wherein (B) consists essentially of said siloxane (III).

* * * * *